United States Patent
Abrigo et al.

(10) Patent No.: US 8,486,316 B2
(45) Date of Patent: Jul. 16, 2013

(54) PROCESS AND PLANT FOR THE CONTINUOUS MANUFACTURING OF AT LEAST A LAYER OF LATEX FOAM WITH RECESSES

(75) Inventors: Luciano Abrigo, Alessandria (IT); Renzo Villa, Cassano d'Adda (IT)

(73) Assignee: Sapsa Bedding S.R.L., Milan (IT)

( * ) Notice: Subject to any disclaimer, the term of this patent is extended or adjusted under 35 U.S.C. 154(b) by 445 days.

(21) Appl. No.: 12/770,330

(22) Filed: Apr. 29, 2010

(65) Prior Publication Data
US 2011/0104446 A1    May 5, 2011

(30) Foreign Application Priority Data
Oct. 29, 2009    (IT) .................................. MI09A1877

(51) Int. Cl.
*B32B 3/12*    (2006.01)
(52) U.S. Cl.
USPC .......................................... 264/46.5; 264/45.8
(58) Field of Classification Search
USPC ............................................... 264/46.5, 45.8
See application file for complete search history.

(56) References Cited

U.S. PATENT DOCUMENTS

| | | | |
|---|---|---|---|
| 2,150,287 | A | 3/1939 | Minor |
| 3,516,901 | A | 6/1970 | Fultz et al. |
| 5,035,846 | A | 7/1991 | Carotti |
| 6,086,802 | A | 7/2000 | Levera et al. |
| 7,604,761 | B2 | 10/2009 | Abrigo |

FOREIGN PATENT DOCUMENTS

| | | |
|---|---|---|
| DE | 1163532 B | 2/1964 |
| EP | 0 358 914 A2 | 3/1990 |
| EP | 0358914 A2 | 3/1990 |
| EP | 0 955 144 A1 | 11/1999 |
| EP | 1854610 A2 | 11/2007 |
| FR | 2 666 754 A1 | 3/1992 |

OTHER PUBLICATIONS

International Search Report dated Nov. 18, 2011 from counter-part EP Appl. No. 10 004 150.8.

*Primary Examiner* — Joseph S Del Sole
*Assistant Examiner* — Kimberly A Stewart
(74) *Attorney, Agent, or Firm* — Novak Druce Connolly Bove + Quigg LLP

(57) ABSTRACT

Continuous manufacture of at least a layer of latex foam with recesses of unlimited length to be divided in a plurality of blocks of latex foam by transverse cuts. The layer has a thickness between 10 and 20 cm and more. The process includes advancing along a predetermined longitudinal direction a metal laying surface provided with protuberances, gelating, curing. The process includes: a) Before depositing the latex foam inserting, by interference fit, supporting elements of resilient deformability having a predetermined thickness between pairs of protuberances of horizontal rows, the supporting elements of unlimited length; b) Carrying away the supporting elements with the advancing laying surface between an injection latex foam station and a layer extracting station; c) Embedding with latex foam the supporting elements. Advantageously the process forwards the blocks to a washing station and squeezes the blocks to a thickness reduction between 3% and 5% of their initial thickness.

14 Claims, 4 Drawing Sheets

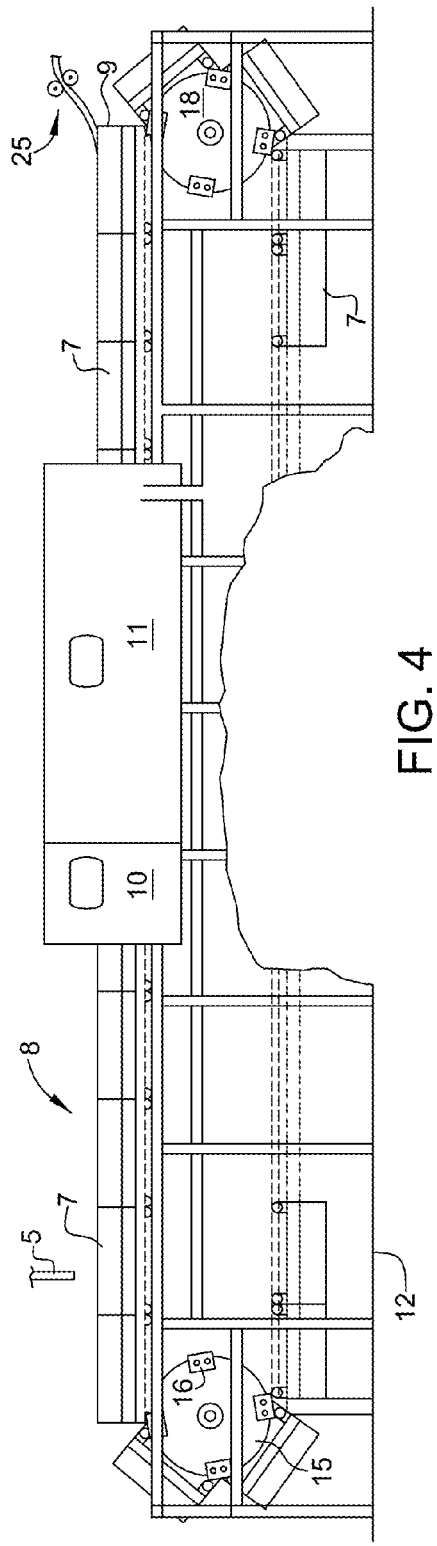
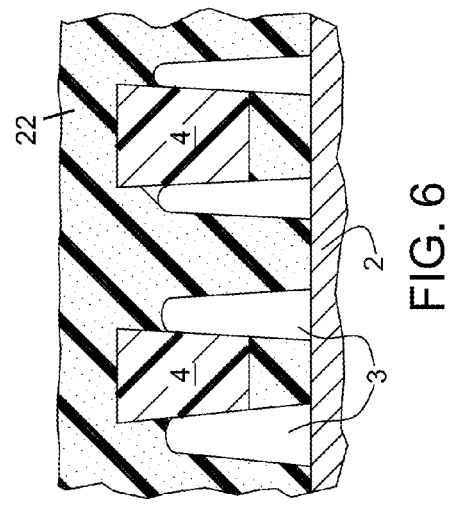
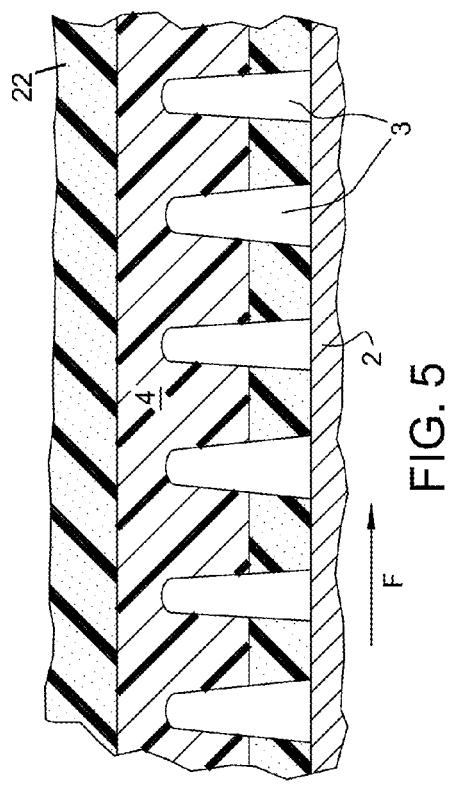

PROCESS AND PLANT FOR THE CONTINUOUS MANUFACTURING OF AT LEAST A LAYER OF LATEX FOAM WITH RECESSES

CROSS-REFERENCE TO RELATED APPLICATION

This claims priority of Italian patent application no. MI2009A001877 filed Oct. 29, 2009, incorporated herein by reference in its entirety.

FIELD OF THE INVENTION

The invention relates to a process and plant for the continuous manufacturing of at least a layer of latex foam with recesses.

More particularly, the invention relates to a process for the continuous manufacture of at least a layer of latex foam (22) with recesses (24) of unlimited length to be divided in a plurality of blocks (B) of latex foam by transverse cuts; said layer having a thickness between 10 and 20 cm and more. The process comprises the steps of advancing along a predetermined longitudinal direction (F) a metal laying surface (2) provided with protuberances (3), of gelating, of curing. The novel part of the process is characterized by the steps of:
a) Before depositing the latex foam inserting by means of interference supporting elements (4) of resilient deformability having a predetermined thickness between couples (pairs) of protuberances (3) of horizontal rows, said supporting elements being of unlimited length;
b) Carrying away the supporting elements (4) with the advancing laying surface (2) between an injection latex foam station (5) and a layer extracting station (22);
c) Embedding with latex foam the supporting elements (4). Advantageously the process comprises the steps of forwarding said blocks to a washing station (25) and of squeezing said blocks to a thickness reduction between 3% and 5% of their initial thickness.

DESCRIPTION OF BACKGROUND OF THE INVENTION

The present invention relates to a process and plant for the continuous manufacturing of at least a layer of latex foam of unlimited length comprising a plurality of recesses in all its extent derived from respective protuberances arranged on a laying surface of the latex foam continuously advancing.

The layer is divided into a plurality of blocks of latex foam by transverse cuts in order to manufacture rest items such as pillows and particularly mattresses wherein the aforementioned latex foam blocks are between and 20 cm thick and more. More specifically the invention relates to the aforementioned processes where processing steps and plant devices capable not only of forming a latex foam layer having a uniform density but also of affecting the characteristics of the end product with greater stability and lower costs than the known art are achieved.

Continuous processes for the continuous manufacturing of latex foam layers provided with recesses are known.

To this end Patent EP 0 358914 describes a continuous process wherein a laying surface of the latex foam consisting of a plurality of metal plates provided with aluminium protuberances is continuously advanced according to an annular path between two pulleys, a driving pulley and a driven pulley.

The plates move along an upper branch of the annular path between a first laying station and a extracting station of the continuous layer passing through adapted heating devices, for the known gelating and curing steps, placed between the two aforementioned stations.

All through its cellular body, the layer receives heat necessary to its stability either through said adapted heating devices or through heat coming from the metal plates and the protuberances heating.

It should be noted that the state of the art described in this Patent mentions some continuous processes wherein the latex foam deposits on a protuberance-free metal band to form items of limited thickness, up to 5 cm.

This process, as described in the aforementioned Patent, is unsuitable for forming latex foam layers having great thickness, for mattresses formation for example, as the absence of the protuberances prevents enough heat transfer through the whole cellular body thus preventing gelating and curing of the latex foam layer.

Thus, as stated in Patent EP 0 358914 and as known to those skilled in the art, continuous processes with protuberance-free laying surfaces for the foam do not allow the manufacturing of mattresses having a thickness between 14 and 18 cm and recesses having a depth of 11 cm, for example.

These known continuous protuberance-free processes and plant are usually used to form latex foam layers having a small thickness and usually employed in manufacturing carpets, sanitary packs or coatings.

Other processes which make use of a laying surface and metal protuberances adapted to continuous formation of unlimited length latex foam layers with recesses having a high thickness between 10 and 20 cm and more are already known.

To this end reference is made to Patent EP 0 955 144 wherein the laying surface consists of a plurality of carriages each provided with a laying surface and a plurality of protuberances.

The carriages move along an annular path between two pulleys.

The continuous processes described in Patents EP 0 358914 and EP 0 955 144 are suited to manufacture latex foam blocks provided with recesses and having a high thickness and their characteristics and performances prove to be satisfactory.

For a better understanding of the invention to be described afterwards, it is worth noticing how the various mattress manufacturers compete in the attempt to achieve more and more significant results in order to account for improvements of specific characteristics of the product. In this perspective the different steps of the process have been gone through in search of further conditions which, thoroughly investigated, could lead to improvements unexpected so far.

It should be considered that the continuous processes, which will be referred to later, make use of latex foam the laying of which on the laying surface requires great care as the latex foam is so unstable that might cause collapse in the cells of the material.

In order to face up with such a risk, the gelating process is performed which prevents the latex foam to collapse after its deposit. However it must be clear that the latex foam collapsing phenomenon affects the whole manufacturing cycle.

Consequently though the gelating step and the successive curing step are accurate, in the end product it has been observed a variation in density of the foam with values in the recesses' area lower than in the area above the recesses.

Such a variation in density has been ascribed to the maximum instability condition of the foam that is when the gelating step has not taken place yet.

Before the gelating step, the latex foam tends to collapse deeper in the area among the protuberances of the laying surface than in the area above the protuberances.

Special attention has been drawn to the presence of closed air bubbles close to the ends of recesses. This is not a minor problem as it affects the foam layer in all its length thus creating, for lengths equal to the layer longitudinal size, for example for lengths in the order of hundreds of meters and more, innumerable bubbles which cause a lesser density in the area of their localization than in the areas where the bubbles are absent.

It has been thought that such air bubbles were due to the maximum instability of the foam so once again during the foam laying before the gelating step.

In order to ensure a uniform density of the foam all through the definitive product, it was then decided to make use of means capable of giving support to the latex foam among the protuberances and of means capable of draining the air bubbles off otherwise present at the protuberance ends.

Thus it has been perceived possible to create means capable of applying supporting forces substantially similar to those exerted by the protuberances towards the foam and adapted to offer escape routes to air bubbles thanks to their transpiration characteristics.

SUMMARY OF THE INVENTION

Following this thought we came to the conclusion that the use of the aforementioned means not only during the processing steps but also in the end product could lead to a greater or lesser rigidity in some areas corresponding to predetermined parts of the user's body, if required by a user, all this using lesser latex foam and consequently at a price lower than the known product.

It is therefore a first aspect of the present invention a process for the continuous manufacturing of at least a latex foam layer of unlimited length provided with recesses to be divided in a plurality of blocks of latex foam by transverse cuts having a thickness between 10 and 20 cm. and more, comprising the steps of advancing along a predetermined longitudinal direction a metal laying surface provided with protuberances between a first and a second station, said protuberances having ends laying on a horizontal plane and being placed along horizontal rows pointed towards said longitudinal direction and transversal rows, of laying the latex foam in said first station on the laying surface continuously advancing, of gelating, of curing, of extracting the continuous layer in said second station.

The invention is characterized by the steps of:
a) before depositing the latex foam, inserting by means of interference supporting elements of resilient deformability having a predetermined thickness between couples (pairs) of protuberances of horizontal rows, said supporting elements being of unlimited length;
b) carrying away the supporting elements with said advancing laying surface between said stations;
c) embedding with latex foam the supporting elements. Advantageously the process is characterized by
d) forwarding said blocks having the supporting elements embedded into the latex foam to a washing station;
e) squeezing said blocks embedding the supporting elements.

Typically the process is characterized by the fact of maintaining the lower ends of the supporting elements placed between pairs of protuberances at a distance from said laying surface.

Preferably the process is characterized by the fact of protruding, for a predetermined quantity the supporting elements placed between pairs of protuberances above said horizontal plane.

A second object of the present invention is a plant for the continuous manufacturing of a latex foam layer provided with recesses of unlimited length to be divided in a plurality of blocks of latex foam by transverse cuts, comprising a metal laying surface provided with protuberances having ends laying on a horizontal plane and being placed along horizontal rows pointed towards a longitudinal direction and transverse rows, a first station provided with an injection device for the laying of the foam, a second extraction station of the foam layer, a gelating and vulcanising device both placed between said first and second stations.

Novel characteristics of the plant comprise first means capable of opposing the foam latex collapse before the gelating until the manufacture of the foam block, second means capable of making the latex foam uniform.

In this plant the first and second means are embedded into the latex foam during the manufacturing of the layer and remain embedded in the latex foam of said blocks after the aforementioned transverse cuts.

The above mentioned means consist of supporting elements resiliently deformable and of predetermined thickness which have been inserted by way of interference (an interference fit or friction fit) between couples (pairs) of protuberances of horizontal rows before operating the plant.

Advantageously the supporting elements are at least partially permeable to gaseous fluids and form accumulators and escape routes for such gaseous fluids.

Advantageously the supporting elements resiliently withstand compression forces which, when exerted on said foam blocks, are responsible for a thickness reduction between 3 and 5% of the initial thickness.

It is a third object of the present invention a latex foam layer of unlimited length having a thickness between 10 and 20 cm. and more to be divided into a plurality of blocks by transverse cuts.

The layer comprises a plurality of recesses placed in horizontal rows along a longitudinal direction and placed in rows transversal to said longitudinal direction.

A novel characteristic of the layer consists in the fact that it comprises supporting elements resiliently deformable, of unlimited length, having a predetermined thickness between pairs of recesses, said supporting elements being embedded into the latex foam and placed at a distance from the lower surface of the layer.

BRIEF DESCRIPTION OF THE DRAWINGS

The present invention will be further described with reference to the accompanying drawings to be considered in all respects as illustrative and not restrictive, in which:

FIG. 4 is a longitudinal view of a preferred form of the plant including the detail of FIG. 3;

FIG. 5 shows the portion of the plant of FIG. 1 during a step of the manufacturing cycle;

FIG. 6 is a cross section of FIG. 5;

DETAILED DESCRIPTION OF THE PREFERRED EMBODIMENTS

The plant of the following description is adapted to form at least a latex foam layer of unlimited length to be divided by transverse cuts in a plurality of mattresses each provided with recesses.

In an example, the mattress created by the process of the invention could be between 14 and 16 cm. high and in other examples 20 cm and more.

Figure 1:
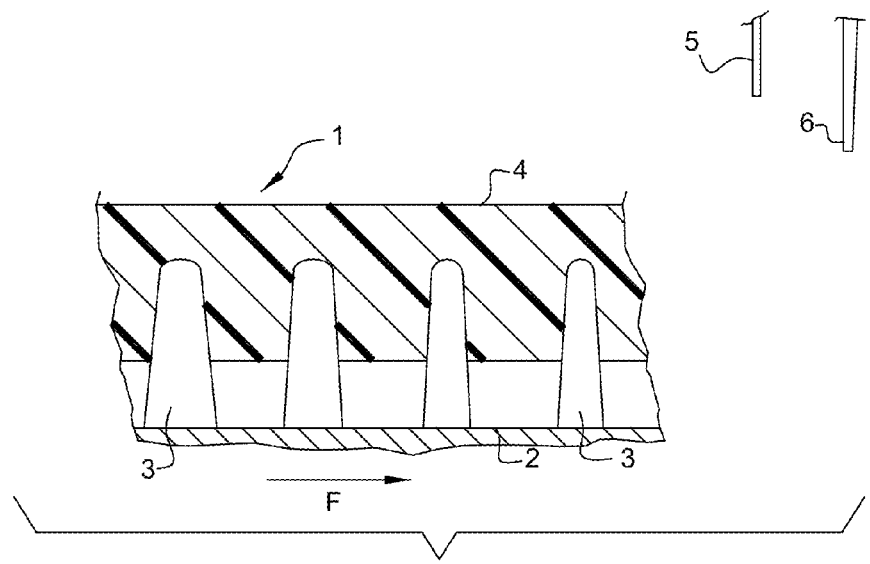
FIG. 1 is a longitudinal scrap view of a portion of the plant according to the invention before the manufacturing cycle.
Figure 2:
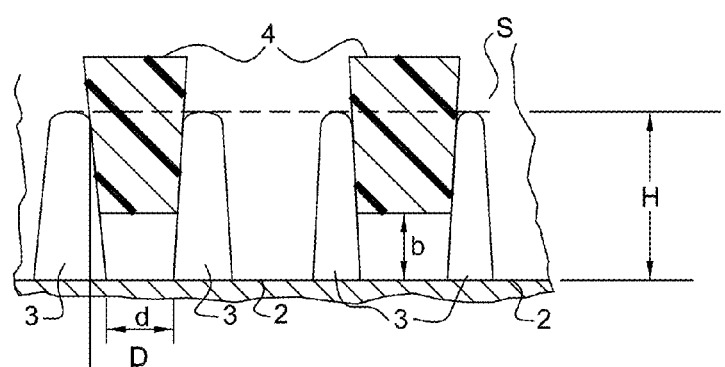
FIG. 2 is a cross section of FIG. 1.

The initial part of the plant partially depicted with reference 1 in FIGS. 1 and 2 comprises, in its essential form as to the aim of the invention, a metal surface 2 provided with a plurality of protuberances 3 intended for recess formation and with a plurality of supporting elements 4 made of a polymeric material, resiliently deformable and capable of resiliently withstand compression forces.

The supporting elements can be made of polyester, polyurethane foam, latex foam as for the following example, or of other plastics and/or elastomers where the presence of open cells and of small through-channels make them permeable to gaseous fluids.

The metal surface 2 continuously advances in a longitudinal direction according to arrow F and forms the laying surface of the latex foam injected by an injection device 5 transversally moved in one and in the opposite direction with respect to the advancement direction F.

A doctor blade 6, at a distance from the protuberances 3 follows the injection device and is for levelling the latex foam.

The blade could be of a shaped profile in order to model the surface it is acting on according to a specific pattern different from the flat pattern, a wavy configuration for example.

The protuberances protrude from surface 2 and are in a great number, between 40 and 84 protuberances per square decimeter, for example.

The protuberances can be of different shape: a circular base tapering off upwards ending in a pointed head or with a circular radius, as in FIG. 2, or according to any other shape known in the art.

Height "H" of the protuberances measured between the laying surface 2 and plane "S", defining the ends, can range between 50 and 60% of the total height of the definitive product, in the example shown in the figure, height "H" is 10 cm.

Protuberances 3 are arranged in parallel rows both horizontally in longitudinal direction F and transverse to the longitudinal direction forming as a whole a thick grid of protuberances.

Preferably the distance "d" between the opposite surfaces of two contiguous protuberances, measured on surface 2 is 2 cm. and the maximum distance "D" at the ends of two contiguous protuberances is 3 cm.

Each protuberance in the example of this description has a circular base whose diameter could be 1.6 cm.

Before starting the manufacturing process, the supporting elements 4 are seated by interference with their initial parts to adjacent couples of protuberances arranged in horizontal rows before reaching the injection device 5.

Elements 4 may cover the whole length of the continuously forming latex foam layer and are operative during the plant operation.

Such elements 4 are both means to withstand local latex foam collapsing and to ensure the latex foam is uniform in some specific areas, as explained in detail later on.

Furthermore elements 4, being embedded into the latex foam may create proper stiffness in specific areas of the definitive product for the rest of some parts of the user's body.

In other words elements 4 are capable of preventing local variations in density of the foam due to its laying characteristics and to the continuous layer manufacturing steps and also capable of ensuring changes in the stiffness required in some parts of the definitive product according to initial predetermined choices of their physical characteristics.

The relationship between protuberances 3 and elements 4 is shown and described with reference to FIG. 2 and constitutes a basic characteristic of the plant operation.

Elements 4 are placed between the protuberances being at a predetermined distance "b" from the laying surface 2 of the foam.

This is the essential condition for elements 4 to be fully embedded into the latex foam.

Preferably the value of distance "b" between the base of element 4 and the plane "S" ranges between 30% H<b<80% H.

The maximum value of distance "b" allows for an adequate contact area between the protuberances and the elements 4.

The minimum value of distance "b" allows for a large contact surface between elements 4 and protuberances 3.

Plant 1 comprises a metal laying surface 2 made in different ways.

In one example, surface 2 could be the base surface of a plurality of carriages 7 (FIG. 3) provided with protuberances 3.

The carriages 7 are a part of an annular configuration (FIG. 4) comprising two branches and precisely:

An upper branch 8 where carriages 7 advance in line and in contact with one another between an injection station 5 and an extracting station 9 of the continuous layer first going through a gelating device 10 and then through a curing device 11, preferably a tunnel filled with heating vapour;

A lower branch 12 for the return of the carriages, fewer in number than in the upper branch.

The carriages move according to separate and independent drive systems and the carriages speed of the second branch is higher than in the first branch.

Figure 3:
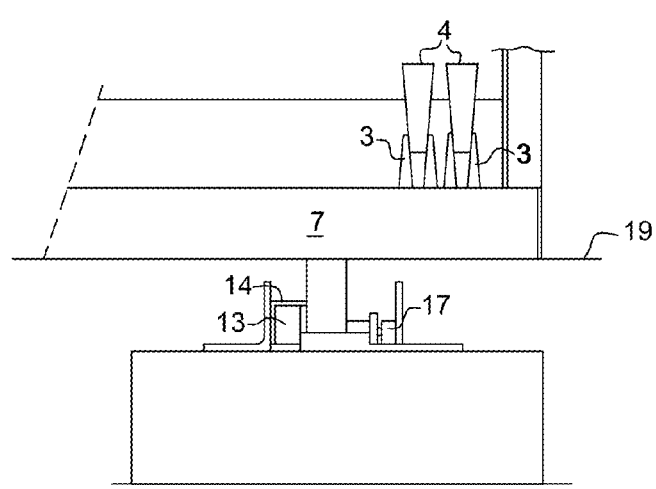
FIG. 3 is a detail of the plant before the manufacturing cycle in a preferred form.

The carriages are provided with wheels 13 sliding along proper rails 14 of a fixed structure (FIGS. 3; 4).

The plant comprises (FIG. 4) two pulleys: a drive pulley 15 provided with gripping means in the form of holes 16 capable of engaging with spindles 17 of the carriages, and a driven pulley 18 capable of carrying the carriages to the lower branch using the aforementioned gripping means.

The carriages in the return branch rest on correspondent conveyor belts by means of apt flanges thus reaching the drive pulley which pushes them to go along the upper branch.

For sake of simplicity the description of other parts is omitted as broadly described in Patent 0 955 144 to which reference is made for any further explanation, if necessary.

Elements 4 are manufactured separately in the shape and according to the manufacture characteristics of the material they are made of, therefore elements 4 made of latex foam are already cured and then clamped by interference to couples of adjacent protuberances.

In the case shown in FIG. 2, a first element 4 is joined to a first couple of protuberances, a second element is joined to a third couple of protuberances and so on alternatively distributed among the couples of protuberances as aforementioned or following predetermined changes according to customized performances that could be required for the mattress.

In one example, there could be placed as many elements 4 as the adjacent couples of protuberances along the horizontal rows.

In a following step, the laying surface 2 together with elements 4 clamped to the different couples of protuberances passes under the injection device 5 fully embedding the plurality of elements 4 into the latex foam (FIGS. 5, 6).

During this step, the elements 4 constitute the fundamental means to solve the problems on which the invention is based.

Figure 7:
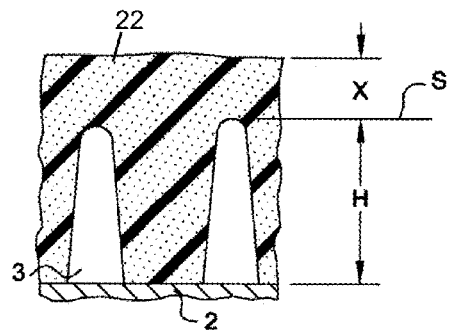
FIG. 7 is a longitudinal scrap view of an ideal condition of the state of the art for the definitive product.

For a better understanding of the invention, the state of the art concerning the laying step of the foam layer on a portion of the laying surface 2 before the gelating step is schematically depicted in FIG. 7.

The required condition was to form a layer having a desired height "X" above plane "S" delimiting the ends of the protuberances 3.

The result obtained is not the result intended as (FIG. 8) the latex foam undergoes a collapse therefore reaching a height "x" smaller than the aforementioned value "X" desired.

Figure 8:
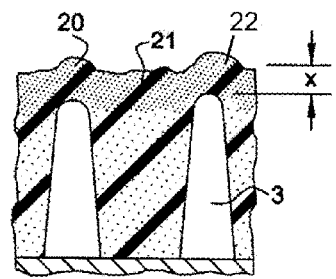
FIG. 8 shows the real condition of the state of the art for the definitive product.

This situation could be explained as follows:

It could be assumed that the latex foam area 20, visible in FIG. 8, is supported by the side surfaces of the innumerable protuberances apt to withstand the foam collapse while the area 21 above plane "S", lacking support, would undergo a severe collapse thus decreasing value "X" to a lower value "x".

It should be noticed that the collapsing of the latex foam takes place not only before the gelating step but from the beginning to the end of the manufacturing step of the product as well.

Consequently the foam layer density above the protuberances will be greater than the density of the area around the protuberances.

The result is not satisfactory since after the curing step, some specific areas would show a non-uniform density of foam with respect to other areas.

It has been favourably noticed that the presence of the supporting elements 4 greatly reduces the risks of local collapsing of the foam compared to the state of the art.

There could be given the following explanation for what noticed without being of any detriment to the validity of the invention if the assumption made prove to be wrong.

Supporting elements 4 placed between couples of protuberances would be of further support capable of supporting the latex foam in withstanding a severe collapse.

It could be reasonably stated that in this process, elements 4 would act as a second array of protuberances responsible for the raising of the level reached by the latex foam above the protuberances compared to the state of the art.

In order to achieve the aforementioned advantages, the elements 4 could have their upper ends in line with plane "S" delimiting the ends of the protuberances. However the process advantageously makes use of supporting elements 4 selected so that their support allows the latex foam to reach large height values over plane "S".

Preferably the elements 4 have their upper ends protruding above plane "S" for a value "a" ranging between 20% H and 45% H, where H is the protuberance height measured from surface 2 (FIG. 2).

It has been found that the upper limit of value "a" is a compromise solution between the need of withstanding the collapsing of the foam and the correspondent rising of the foam in gap 21 (FIG. 8) among the protuberances with respect to the values found in the state of the art and the need to stop the height of the foam above plane "S" at a value capable of ensuring heat exchange necessary to gelating and curing, all through the latex mass.

Figure 9:
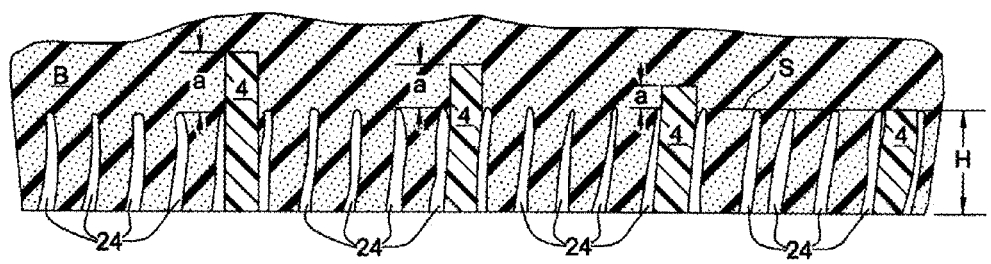
FIG. 9 is a copy of a photograph relating to a cross section of a latex foam block obtained by the process of the invention.

In order to emphasize the unexpected contrast due to the presence the elements 4 to the foam collapse, FIG. 9 shows a photographic copy of a cross section of a portion of a latex foam block "B" at the end of the manufacturing cycle.

In this photo, block "B" has four supporting elements 4, made of polyurethane in this test, embedded into the latex foam between adjacent couples of recesses and various areas comprising recesses without the elements 4.

For a better clearness, in the photographic copy, lines mark the boundary and the inside of elements 4 in the latex foam and, for a better visibility, the recesses have been marked at their boundary.

As it can be observed, three of elements 4 protrude of a distance "a" different from one another with respect to plane "S", while the last element 4 on the right has its upper end on the plane "S".

Figure 9A:
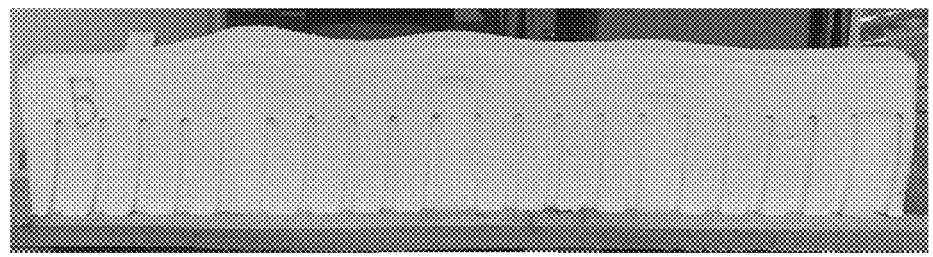
FIG. 9A is the photograph from which FIG. 9 was based.

In FIG. 9A the photograph clearly shows how the maximum collapsing value of the foam, represented by depressions, is in the area where recesses 24 without elements 4 are found and it clearly shows the considerable contrast to the foam collapse where the elements 4 between couples of recesses are found.

Particularly, the area where the maximum contrast to collapse is found corresponds to the maximum value "a" that is where the protrusion of the first element 4 on the left as to plane "S" is at its maximum.

The second and third element 4 still withstand the collapsing of the foam with different values as to their value "a" while the last element 4 on the right withstands the foam collapse with respect to the area where the recesses without elements 4 are present even if to a lesser extent as to elements 4 having the value "a" greater than zero.

For sake of simplicity, the photograph in FIG. 9 shows a limited number of elements 4 but it is obvious that an increase in the number of elements 4 makes it possible to considerably approach the geometric dimensions required for block "B" in the beginning.

The result achieved represents a remarkable profit as nearly the whole foam material employed can be moulded in a thickness substantially constant and with uniform density characteristics.

Moreover, still referring to the process step before gelating, the supporting elements 4 are further means to make the latex foam uniform.

Figure 10:
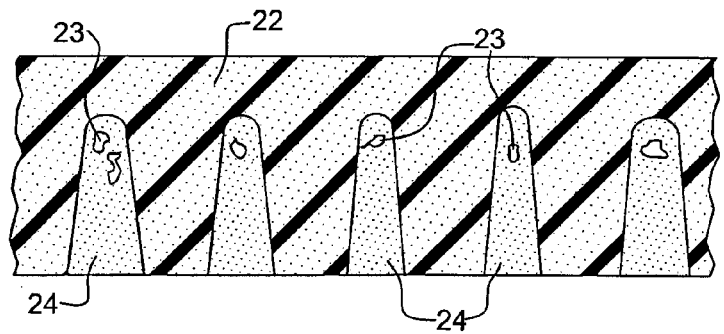
FIG. 10 shows in a longitudinal section the presence of air bubbles in the end product according to the state of the art.

For a better understanding of the invention, FIG. 10 shows how a foam layer 22 of a definitive product of the state of the art would be.

The cross section of FIG. 10 reveals the presence of air bubbles 23 closed and placed close to the ends of the recesses 24 at the end of the manufacturing cycle.

It is suggested that the air bubbles are generated during the manufacturing process by the heat transferred to the foam mass by the metal laying surface of the foam and by the metal protuberances.

The heat transferred, passing on a mass of foam rich in water would form a gaseous fluid which, starting from the base of the metal surface 2, would find a preferred pathway along the side surfaces of the protuberances going up towards their ends.

The gaseous fluid getting in touch with an unstable, low-resistance cellular mass, where the cells are closed as the gelating step has not yet been formed, would turn into bubbles which, going through the protuberances and the cellular mass, persist in the end product in the upper portion of the foam where the recesses are.

Also in this case the definitive product has non uniform characteristics as in the curing steps which follow, the plurality of bubbles remain embedded into the latex foam.

Surprisingly, once more by means of the supporting elements 4 the present process proves to be capable of solving what found in the state of the art as it can be verified observing the items according to the invention in cross section.

Figure 11:
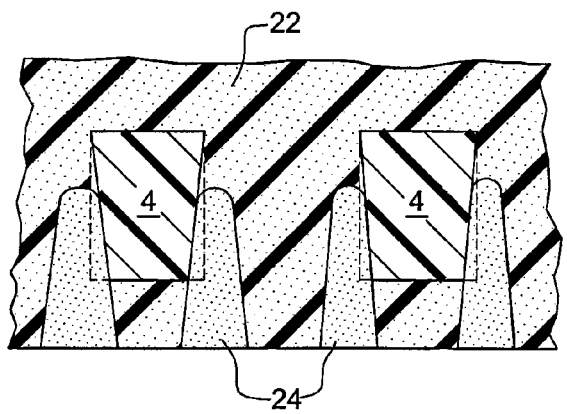
FIG. 11 shows in a longitudinal section the absence of air bubbles in the end product with the process according to the invention.

The cross section in FIG. 11 shows how the layer 22, obtained by the process according to the invention, appears.

In this section the absence of air bubbles close to the ends of recesses 24 and elements 4 fully embedded into the latex foam can be appreciated.

As can be clearly seen in FIG. 11, the elements 4 joined by interference between the couples of protuberances during the embedding cycle resiliently resume their original shape invading a small portion of the gap between the recesses 24 shown with dotted lines in the figure.

As for the absence of air bubbles, what follows is an explanation given as an assumption which is not prejudicial to the validity of the invention if it proves to be wrong.

The plurality of elements 4 inserted between the side surfaces of the protuberances would act as a plurality of accumulators capable of catching the gaseous fluids along the longitudinal extent of elements 4, thanks to their absorption characteristics, up to the ends towards the exit where the fluids dissolve in the air.

The process of the invention makes use of elements 4 of unlimited longitudinal extent and preferably of remarkable height in order to make accumulators of enough capacity.

To this end, value "b", that is the distance between the element base and the laying surface 2 (FIG. 2) can be 30% of H, consequently the portion of element in touch with or very close to the side surfaces of the protuberances is broadly extended so that the elements 4 are able to catch and absorb a great deal of gaseous fluids in order to overcome the air bubbles problem otherwise present in the end product.

The plant comprises other process steps performed during the continuous advancement of the plurality of carriages 7 where elements 4 are already embedded into the latex foam.

These carriages (FIG. 4) go through the gelating device 10 receiving the heat necessary to stiffen the latex foam, then through the curing tunnel 11 where the vapour inside the tunnel transfers the heat and the pressure necessary to the reticulation of the latex foam and to its final stabilization.

In a further step, the continuous layer containing elements 4 is taken off the carriages going through a pair of rollers 25 rotating in opposite directions and is carried to a cutting device of a known type.

During this step, the continuous layer embedding the elements 4 undergoes a plurality of cuts transverse to the longitudinal direction to create a plurality of foam blocks forming the core of mattresses, each embedding a plurality of longitudinal elements 4 distributed as it has been described for the manufacturing process. Each mattress is defined by a width between two adjacent transverse cuts a distance along longitudinal direction F and by a length a distance according to the cutting direction.

Figure 13:
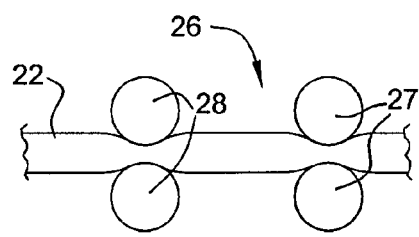
FIG. 13 is a schematic view of the washing device with the squeezing step of the plant.

In a further step, the mattresses are forwarded to a washing device. Such washing device 26 (FIG. 13) is apt to remove from the mattresses surfactants or other kind of substances, commonly used in the manufacturing process.

The washing device, of the type described in Patent FR 2666754 for example, may comprise a plurality of rolls to guide the mattresses embedding the elements 4, washing means to convey water on the mattresses, pairs of opposed rolls rotating in opposite direction for the final squeezing (27, 28) apt to carry the mattresses and to press them locally thus discharging the water absorbed.

It should be noted that the pressing of the mattress may reach values between 3 and 5% of its thickness.

Advantageously the above mentioned squeezing and pressing steps are performed without destroying or damaging the supporting elements 4 made of compressive elastic deformable materials.

In other words, the supporting elements 4 can have a compressive elastic deformation degree corresponding to the latex foam they are embedded in or even greater as long as, whatever their deformability is, the washing step would not become difficult and the layer, together with all its components, resumes its shape thanks to its resilience at the end of the washing step.

Therefore each mattress comprises supporting elements 4 having a density greater, equal or lesser than the latex foam where they are embedded in.

Advantageously by choosing an embedding process of supporting elements along couples of longitudinal protuberances chosen so as, in the end product, the parts comprising the elements correspond to predetermined and desired rest parts for the user's body, it is possible to give differentiated rigidity characteristics to different areas of the mattress.

As a further advantage, the presence of areas having different densities in a mattress is obtained by the step of embedding supporting elements 4 into the latex foam forming the core of the mattresses, therefore with no mechanical actions on the definitive product as made in some process of the state of art, firstly for the removal of the latex foam and after for the insertion of means capable of creating the aforementioned differentiated areas as for density.

The invention has been illustrated and described with reference to a preferred embodiment, however many alternatives are possible, for example the supporting elements 4 could consist of a group where more elements are connected to one another by upper bridges made of the same material as the element to be concurrently connected by interference on respective couples of protuberances of adjacent rows.

Figure 12:
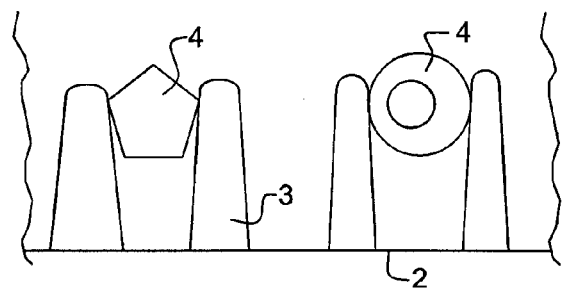
FIG. 12 is an alternative of FIG. 1.

Furthermore the element 4 connected to couples of protuberances 3 could have a different shape than the one shown in the figures, for example such element 4 could be polygonal in shape or even irregular in its cross section or it could be a solid or hollow tubular with an elliptic or circular section (see FIG. 12).

The supporting element 4 could be made of resiliently deformable material whose strength could be increased, for example by using an element trapezoidal in section wherein inextensible wires above the neutral axis ensure a proper opposition to the dragging forces exerted by its association to the couples of protuberances continuously advancing.

The process could be performed making use of more supporting elements 4 some of which extending along longitudinal lengths different from one another so that, due to the transverse cuts on the continuous foam layer, mattresses, whose density-differentiated areas are different from density-differentiated areas of other mattresses produced using the same continuous manufacturing cycle, can be obtained.

The invention claimed is:

1. Process for the continuous manufacture of at least a continuous layer of latex foam with recesses of unlimited length to be subdivided in a plurality of blocks (B) of latex foam by transverse cuts having thickness of 10 cm and or more, comprising the steps of:
    advancing along a predetermined longitudinal direction (F) a metal laying surface provided with protuberances between a first and a second station, the protuberances having ends laying on a horizontal plane (S) and being placed along horizontal rows pointed towards said longitudinal direction (F) and transverse rows,
    depositing the continuous layer of said latex foam in said first station on said laying surface while said laying surface is continuously advancing,
    gelating said continuous layer,
    curing said continuous layer,
    extracting said cured continuous layer in said second station;
    the process further comprising:
    a) before depositing the latex foam, inserting by interference fit supporting elements of resilient deformability between pairs of protuberances of said horizontal rows, said supporting elements having predetermined thickness and being of unlimited length;
    b) carrying away the supporting elements with the advancing laying surface between said first and second station;
    c) embedding with latex foam said supporting elements; and
    d) maintaining the lower ends of said supporting elements placed between said pair of protuberances at distance (b) from said laying surface.

2. Process according to claim 1, further comprising:
    d) forwarding said blocks (B) of foam having the supporting elements embedded in said latex foam towards a washing station;
    e) squeezing said blocks (B) of foam having said supporting elements.

3. Process according to claim 1, wherein the continuous layer of latex foam has thickness between 10 and 20 cm.

4. Process according to claim 1, wherein said supporting elements placed between respective pairs of protuberances protrude a predetermined quantity above said horizontal plane (S).

5. Process according to claim 1, comprising pairs of the protuberances without the supporting elements between pairs of the protuberances with the supporting elements.

6. Process according claim 1, comprising inserting between the pairs of protuberances of a first said horizontal row a first said supporting element having at least one characteristic different from a second said supporting element inserted between the pairs of protuberances of a second said horizontal row.

7. Process according to claim 1, comprising advancing along said longitudinal direction (F) a first said supporting element inserted between pairs of the protuberances of a first said horizontal row having a first longitudinal length different from a second longitudinal length of a second said supporting element between pairs of the protuberances of a second said horizontal row.

8. Process according to claim 1, comprising introducing between a said pair of adjacent protuberances supporting elements of polygonal shape.

9. Process according to claim 1, wherein said continuous layer having embedded supporting elements is subdivided by transverse cuts to obtain mattresses of latex foam with recesses.

10. The process according to claim 1, wherein said supporting elements are permeable to aeriform fluids and form accumulators and escape routes for said aeriform fluids.

11. The process according to claim 1, wherein said supporting elements are for resiliently withstanding compression forces on said blocks with a thickness reduction between 3 and 5% of the initial thickness of the blocks.

12. The process according to claim 1, wherein said supporting elements inserted by interference fit between adjacent protuberances have a base at a distance (b) from said laying surface, said distance (b) being between 0.30 and 0.80 H where "H" is the height of said protuberances.

13. The process according to claim 1, wherein said supporting elements have their upper ends protruding above said horizontal plane (S) for a value "a" comprised between the 20% H and the 45% H where "H" is the height of said protuberances.

14. The layer process according to claim 1, wherein the layer is transversally cut to have blocks of latex foam corresponding to mattresses, wherein said supporting elements are embedded in the foam latex along pairs of recesses according to predetermined parts supporting the user's body.

* * * * *

UNITED STATES PATENT AND TRADEMARK OFFICE
CERTIFICATE OF CORRECTION

PATENT NO. : 8,486,316 B2
APPLICATION NO. : 12/770330
DATED : July 16, 2013
INVENTOR(S) : Luciano Abrigo et al.

Page 1 of 1

It is certified that error appears in the above-identified patent and that said Letters Patent is hereby corrected as shown below:

In the Claims:

Col. 11, line 10 should read "... having thickness of 10 cm ~~and~~ or"

Signed and Sealed this
Third Day of September, 2013

Teresa Stanek Rea
*Acting Director of the United States Patent and Trademark Office*